Figure 1:
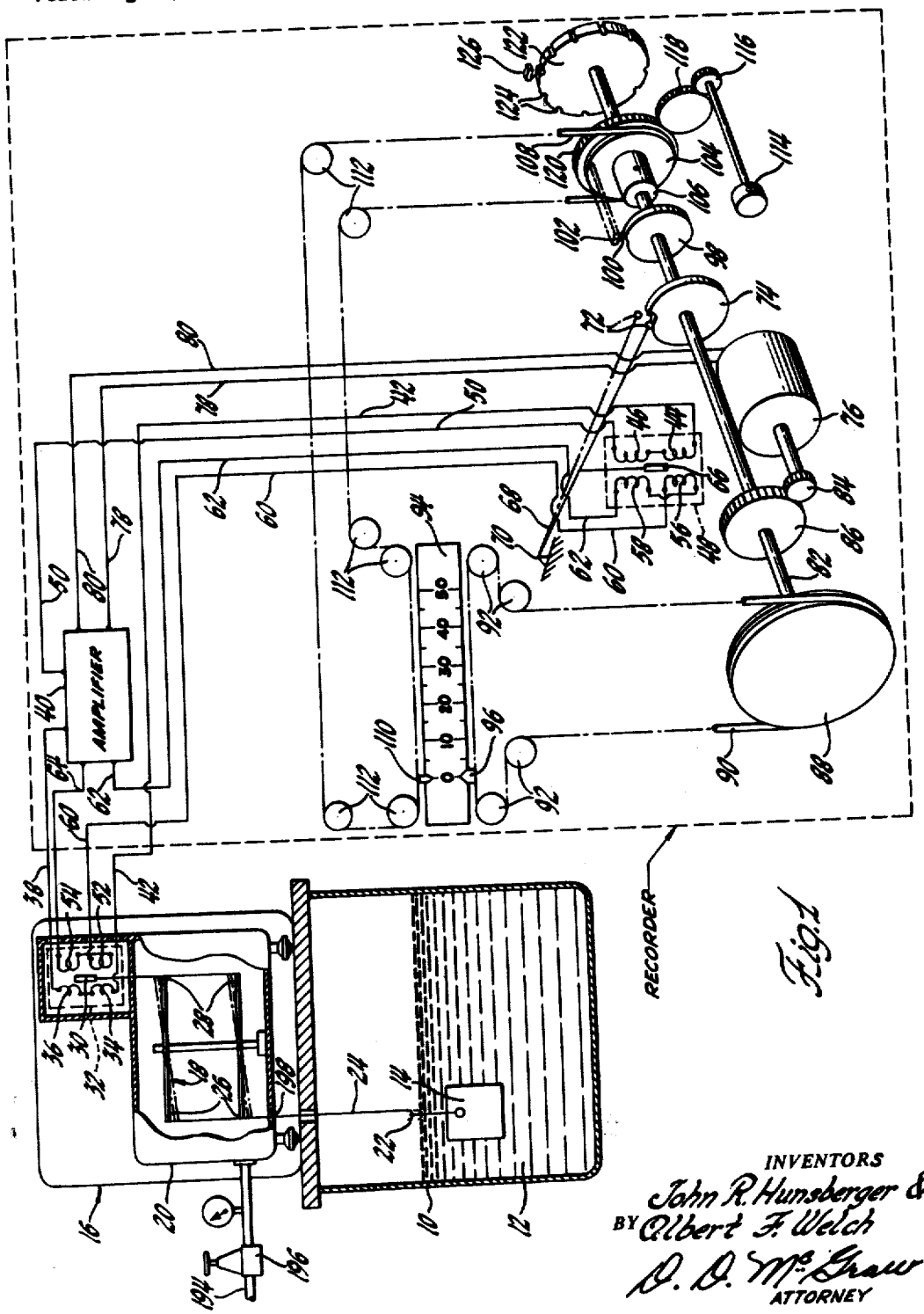

March 12, 1963 J. R. HUNSBERGER ET AL 3,081,194
PLATING THICKNESS INDICATING APPARATUS AND METHOD
Filed Aug. 7, 1959 2 Sheets-Sheet 1

INVENTORS
John R. Hunsberger &
BY Albert F. Welch
D. D. McGraw
ATTORNEY

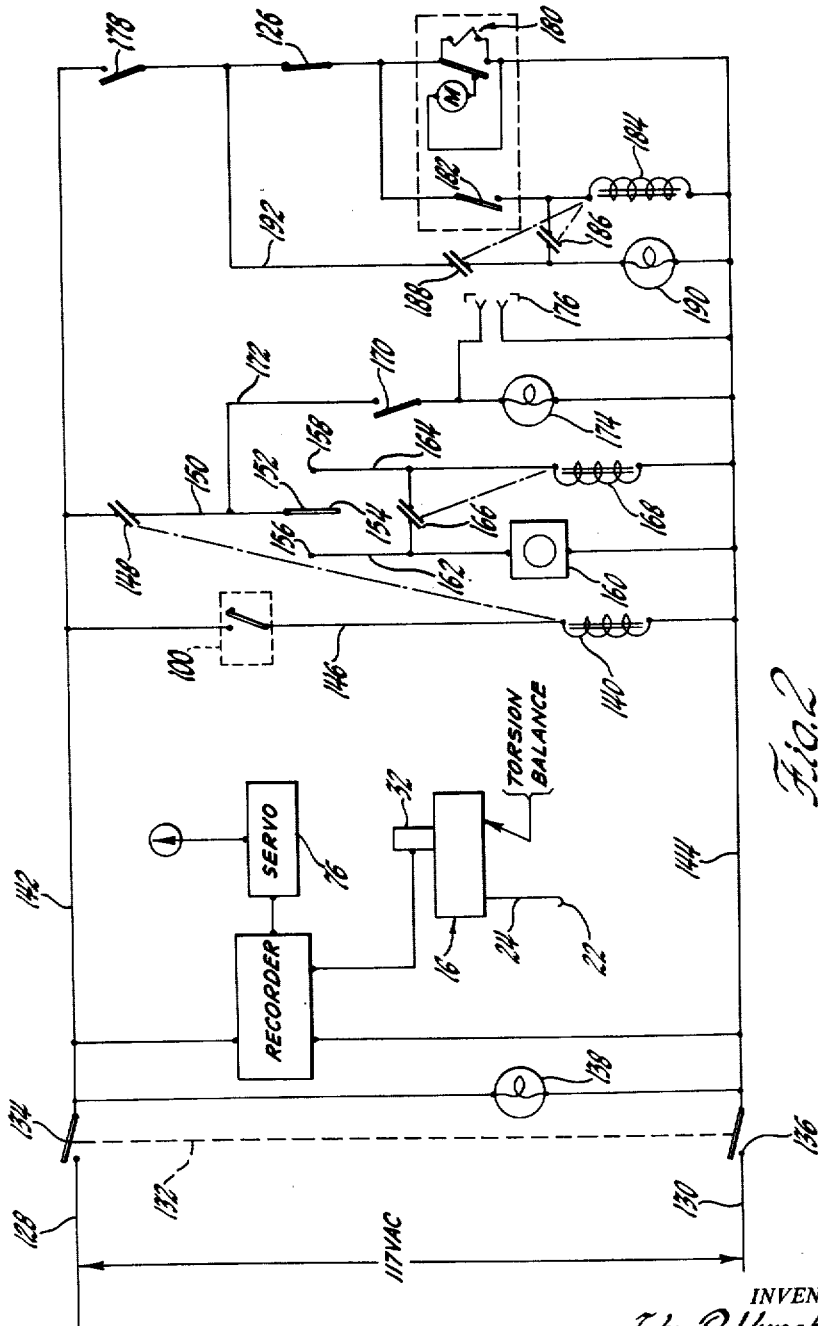

United States Patent Office 3,081,194
Patented Mar. 12, 1963

3,081,194
PLATING THICKNESS INDICATING APPARATUS AND METHOD
John R. Hunsberger, Royal Oak, and Albert F. Welch, Grosse Pointe, Mich., assignors to General Motors Corporation, Detroit, Mich., a corporation of Delaware
Filed Aug. 7, 1959, Ser. No. 832,255
6 Claims. (Cl. 117—113)

The invention relates to apparatus and method for automatically measuring the thickness of the plate applied to a piece of material from a plating bath solution. It may also be used to measure accretion or other physical conditions in which the weight of the workpiece is varied in direct relation to the physical conditions being measured.

The preferred form of the invention is embodied in apparatus and method providing for sensitive measurement of the weight of a workpiece which is having material plated thereon, and converting the measurement into signals which in turn control an indication and recording mechanism. It also controls an indication system in which an indication is given when the desired amount of plating has been accomplished. The preferred form of the invention also provides for an indication of the efficiency of the plating operation by providing a signal when the plating operation is no longer capable of plating material at a desired minimum rate.

In the drawings:
FIGURE 1 is a diagrammatical view of apparatus embodying the invention.
FIGURE 2 diagrammatically illustrates the circuits for the apparatus of FIGURE 1.

While the invention may be practiced in connection with various operations, it will be described in connection with the plating of a metal such as nickel on a metal workpiece held in a chemical bath solution. A tank 10 contains a suitable plating bath solution 12 which by way of example may be suitable for plating nickel on the workpiece 14. It is preferred that the workpiece 14 be a constant area standard test piece so that minimum recalibration of the apparatus is required. The plating of such a standard test piece will indicate the same plating characteristics as those of other workpieces placed in the bath at the same time. The apparatus will then provide no interference with the plating of the other workpieces. If desired, several workpieces in succession may be plated without disturbing the test workpiece so long as the total thickness plated on the test workpiece does not exceed the range on the apparatus recorder.

The plating measuring means 16 is supported over the tank 10 and includes a pivotable balance type support mechanism 18 mounted in the casing 20. The workpiece 14 is secured to a hook 22 and suspended in the bath 12. Hook 22 may be attached to a wire or other support 24 which is connected to one end 26 of the balance support mechanism 18. The other end 28 is connected to a core 30 of a differential transformer 32.

The differential transformer has coils 34 and 36 connected in series with the lead 38 leading from one of the coils to the amplifier 40. The other lead 42 connects to a similar pair of balancing coils 44 and 46 in a second differential transformer 48. Lead 50 from coil 46 is connected back to amplifier 40. Differential transformer 32 has another pair of coils 52 and 54 and differential transformer 48 has a second pair of coils 56 and 58 which are similarly arranged but are connected in opposed relation. Coil 52 is connected to coil 56 by lead 60. Coil 58 is connected to amplifier 40 by lead 62. Coil 54 is connected to amplifier 40 by lead 64. Thus coils 34, 36, 44, and 46 receive power from amplifier 40, and coils 52, 54, 56, and 58 send signals to amplifier 40 to provide a balance circuit. A movable core 66 is provided in the differential transformer 48 adjacent the transformer coils and is connected to a pivotable arm 68. One end 70 of arm 68 is pivoted about a stationary point and the opposite end 72 engages and follows the surface of a balancing cam 74. A servomotor 76 is connected to amplifier 40 by leads 78 and 80 and is controlled by the amplifier.

If the cores 30 and 66 of the differential transformers are balanced so that no current flows in the secondary opposed circuit including coils 52, 54, 56, and 58, the output of the amplifier will be zero and the servomotor 76 will not run in either direction. As the weight of the workpiece increases due to the plating out of nickel thereon, the workpiece will move downwardly and act through the balance support mechanism 18 to move core 30 upwardly in the differential transformer 32. This will unbalance the secondary circuit containing coils 52, 54, 56, and 58 and current will flow in this circuit since the output of the coils 52 and 54 and that of coils 56 and 58 will not be equal. This provides an unbalanced signal which will pass through the amplifier 40 and be amplified therein. The amplified signal is fed to the servomotor 76 which will then turn in a direction determined by movement of core 30.

Servomotor 76 is drivingly connected to shaft 82 through gears 84 and 86. Balancing cam 74 is secured to shaft 82 and will rotate with the shaft. Therefore, when the servomotor 76 is caused to turn, it will drive shaft 82 and cause cam 74 to turn. The movement of cam 74 will act through arm 68 to move core 66. The movement of core 66 tends to balance the differential transformer circuit so as to correct for movement of core 30. The weight of the workpiece 14 therefore increases and shaft 82 is turned an amount in proportion to increase.

An indicating pointer drive wheel 88 is also mounted on shaft 82. A flexible cord 90 passes around wheel 88 and over guide pulleys 92 and is driven by the wheel 88. A portion of the cord 90 passes by the scale 94. An indicating pointer 96 is clipped to the cord 90 and extends in front of the scale 94 so that the rotational position of the shaft 82 is indicated on the scale by the pointer with a straight line movement. The pointer 96 will move across the scale as the weight of the workpiece 14 increases. The calibration of the scale may be in increments indicating the thickness of the plating. It has been found to be quite satisfactory to use increments of 0.0001 inch and the scale 94 is marked to indicate a total reading of fifty ten-thousandths of an inch.

The operator of the apparatus embodying the invention is only required to place the workpiece 14 on the hook 22, adjust the indicator pointer 96 to zero and the differential transformer system to a null, or balanced, condition. He then watches the indicating mechanism and when the indicator pointer 96 arrives at the desired thickness, the workpiece 14 is removed from the bath 12.

It is desirable to warn the operator in some manner of the arrival of the pointer 96 at the desired thickness. In order to accomplish this, a set pointer cam 98 is attached to shaft 82 which will rotate with that shaft. The cam operates a microswitch 100 which is supported on the end of an arm 102. In turn this arm is supported on a wheel 104 which is spaced from cam 98. Wheel 104 is supported by shaft 82 by sleeve 106, and is movable with respect to the shaft. The periphery of wheel 104 is grooved to receive a flexible cord 108. This cord drives a set pointer 110 in a manner similar to the driving mechanism for the indicator pointer 96. Cord 108 is passed over guide pulleys 112 so that a straight portion of the cord is aligned with the scale 94. Pointer 110 is clamped to the cord and moves with the cord. The pointer is set by the operator to indicate the final thickness at which the workpiece 14 should be removed.

Adjustment of the pointer is made manually by the use of the manual set knob 114 which rotates wheel 104 about shaft 82 through gears 116, 118 and 120. Gear 120 is either made integral with wheel 104 or is attached thereto so that rotation of gear 120 also rotates wheel 104. Thus in initially setting up the apparatus the operator turns knob 114 until the set pointer 119 indicates the desired plating thickness. In doing so, arm 102 and microswitch 100 are moved to a certain arcuate position which is the position at which the switch actuating section of cam 98 will be when removal of the workpiece 14 is necessary. Thus cam 98 will operate to close switch 100 and provide an indication signal to the operator in the manner described below in connection with the circuits shown in FIGURE 2.

As mentioned above, the plating bath 12 may be used for such a period of time that its strength is reduced below a predetermined desired minimum. This will reduce the plating rate beyond the point where it is practical to continue to use the same bath. It is desirable to provide an indicating and control system which will inform the operator whenever the plating rate drops below the required minimum. The operator can then change the plating bath.

In order to accomplish this, a time clock switch is used which will operate a desirable indicating mechanism in the event that the workpiece 14 is not plated to a certain weight within a fixed predetermined time. A rate-of-plating cam 122 is fixed to the shaft 82 and turns with that shaft. The cam periphery has a series of notches 124 which are circumferentially spaced so as to be indicative of certain plating thickness to be used to determine the rate of plating. It has been found convenient to so space notches 124 so that each space between adjacent notches indicates a plating thickness of 0.0005 inch onto the workpiece 14. A microswitch 126 is mounted adjacent cam 122 and is actuated each time the cam rotates to bring one of the notches 124 into engagement with the switch. If during the period of time required to move a notch into engagement with the microswitch 126, the clock timer switch has not operated, a signal will be given which indicates to the operator that the plating bath is plating at a rate not in excess of the minimum rate established. Details of operation of the circuit and the time clock switch will be discussed below in the discussion of the circuits shown in FIGURE 2.

Referring now to the circuit diagram shown in FIGURE 2, electrical power is supplied through buses 128 and 130. The power may be received from the ordinary 110–120 volt alternating current line. A manually operated power switch 132 controls contacts 134 and 136 in each of the power lines leading from the buses 128 and 130. As soon as switch 132 is closed, a circuit is established through the indicating lamp 138 to indicate the fact that the system is in operation.

As the weight of the workpiece 14 increases due to plating, the balance mechanism described above causes the servomotor 76 to be energized by the unbalance of the differential transformer circuit and to rotate shaft 82 until that circuit is rebalanced. When the weight of workpiece 14 becomes sufficient to cause the servomotor 76 to turn the cam 98 until microswitch 100 is actuated, the relay coil 140 is energized. The circuit for the coil includes power lines 142 and 144, switch 100 and electrical lead 146 which connects the switch 100 and the relay coil 140 to the power lines. Relay coil 140 acts on relay contacts 148 to an indicating circuit through lead 150.

Different types of indicating mechanisms are provided, either of which may be selected by the operator. If the operator desires an audible signal, the audible selector switch 152 may be moved from its center, or off, position 154 either to the contact position 156 or the contact position 158. When switch 152 is at contact position 156 and relay contacts 148 are closed, the buzzer 160 is energized through lead 162. If the operator has engaged switch 152 with contact position 158, buzzer 160 will be energized through lead 164 and time delay switch contacts 166. The time delay switch 166 will open its contacts after a predetermined time, for example, 30 seconds, and will cut off the buzzer 160. The time delay is built into the relay 168 which controls the opening and closing of the contacts 166.

If the operator desires a visual signal to indicate the completion of the plating period instead of an audible signal, he moves switch 152 to contact position 154 so that the switch is open. He then closes switch 170 which is connected to lead 150 by lead 172. Thus, when relay contacts 148 are closed at the completion of the plating cycle time, indicating lamp 174 is energized.

It may also be desirable to energize some other control mechanism or signal at the same time that lamp 174 is energized. Thus connector 176 may be provided in parallel with lamp 174 and the mechanism desired to be actuated may be connected therewith.

The portion of the circuits on the right side of FIGURE 2 includes the rate-of-plating indicating circuit. Switch 126, which is actuated by cam 122, controls the rate-of-plating circuit. Switch 178 is in series with switch 126 and is a manual control switch. It is closed when it is desired to test the plating bath to see if the plating rate is sufficiently high. When switch 178 is closed, timer 180 is energized and the timing mechanism begins its timing sequence. If the bath plating rate is sufficiently high, cam 122 will move sufficiently fast to again open switch 126 as it engages one of the notches 124 before timer 180 has completed the time sequence set on it. The timer 180 will then be mechanically reset to the beginning of its time interval and will start another timing sequence. If, however, the timer 180 completes its timing sequence before switch 126 is opened, it will close switch 182 which leads to the holding relay coil 184. This coil will close holding contacts 186 and lamp energizing contacts 188 so that the indicating lamp 190 is energized through lead 192 and the relay coil 184 is kept energized through the holding contacts 186. This keeps the indicating lamp 190 energized even though the timer 180 is reset mechanically. This prevents a period of time from occurring in which the lamp 190 would be deenergized while the plating rate would be below the desired minimum.

In order to minimize corrosion and other damage to the unit by the bath 12 and the fumes given off by such baths, it is preferred that the interior of casing 20 be charged with clean air at all times while the apparatus is mounted over the bath. This may be accomplished by connecting the purging air line 194 to a suitable air supply. The pressure regulator valve 196 will control the amount of air entering the casing 20 so that a positive flow out of the casing is maintained through aperture 198. This will prevent the fumes from affecting the apparatus.

An apparatus and method have been disclosed and described which will sense the change in weight of a workpiece and will convert the weight change into indications of the change in workpiece thickness and the rate of the change. They will compare the actual change rate with a desired minimum change rate and will also give a signal when a desired change in thickness has been accomplished.

What is claimed is:

1. Mechanism for sensing and indicating the increase in weight of a workpiece being plated and indicating the plating rate, said mechanism comprising a support for said workpiece, signal generating means connected with said support and giving a signal responsive to the increase in weight of said workpiece, means amplifying said signal, first means receiving said signal and decreasing said signal to null, signal indicating means, the amount of signal decrease being indicated on said indicating means to indicate the actual plating rate, timing means establishing a predetermined minimum rate of weight increase of said workpiece which establishes a predetermined minimum plating rate, and means responsive to said signal receiving means and comparing with said timing means to generate a signal when the actual plating rate is below the predetermined minimum plating rate determined by said timing means.

2. Plating indicating means comprising a plating bath and a workpiece being plated suspended in said bath, weight change sensitive means supporting said workpiece in said bath and being sensitive to the increase in weight of said workpiece in said bath, first signal generating means connected with said support and generating a signal in proportion to the increase in weight of said workpiece, second signal generating means connected with said first signal generating means and receiving the signal generated by said first signal generating means and generating an equal and opposite signal, indicating means connected with said second generating means and indicating the plating thickness of said workpiece as a function of said second signal, means actuated by said second signal generating means and generating a signal indicative of the plating rate of said plating bath, comparative timing means interconnected with said plating rate signal generating means and having a predetermined means plating rate and generating a signal when the plating rate of said plating bath becomes less than the predetermined minimum.

3. In combination in a mechanism for determining plating thickness and plating rate of a workpiece suspended in a plating bath as a function of weight change of said workpiece, plating measuring means including a balance supporting said workpiece in the plating bath and sensitive to the change in weight of said workpiece during the plating operation, a balanced differentiating circuit, weight change responsive means for unbalancing said circuit in proportion to the increase in weight of said workpiece and thereby generating a signal, counter balancing means responsive to said signal to rebalance said circuit to provide a null in said circuit, indicating means connected with and actuated by said counter balancing means and indicating the plating thickness of said workpiece, plating rate indicating means connected with and actuated by said counter balancing means, comparative minimum plating rate means connected with said plating rate indicating means and actuating a signal when said plating rate indicating means indicates a plating rate less than the minimum plating rate, and desired plating thickness indicating means connected with and actuated by said counter balancing means and providing a signal when the desired plating thickness is obtained.

4. In combination in an accretion indicating apparatus, a workpiece subject to accretion, weight change responsive means sensing the increase in weight of said workpiece during accretion, a normally balanced circuit comprising first signal generating means connected with said sensing means and converting the workpiece weight increase into an unbalance signal in the circuit, second signal generating means sensing said unbalance signal from said first signal generating means and generating a rebalance signal in said circuit to rebalance said circuit, means establishing a minimum accretion rate, and means responsive to one of said signals and comparing the actual accretion rate of said workpiece to the minimum accretion rate established by said last named means.

5. The method of comparing an actual plating bath plating rate to a desired minimum plating bath plating rate as a function of actual weight change rate to a predetermined minimum weight change rate and comprising the steps of suspending a workpiece in a plating bath from a weight measuring device, weighing the workpiece during the plating process and continually obtaining workpiece weight changes, converting the weight changes into an indication of the actual plating rate of the plating bath, establishing a maximum time for obtaining a predetermined plating thickness to povide a minimum plating rate, and comparing the actual plating rate with the minimum plating rate established.

6. A plating bath, weight responsive means, a workpiece suspended in said bath from said weight measuring means, a signal generating device, actuating means associated with said signal generating device to cause a signal to be produced thereby, said actuating means being actuably connected to said weight responsive means and actuable thereby to actuate said signal generating device, signal control means associated with said signal generating device, motor means controllably connected to said signal control means, signal transfer means connecting said signal generating device and said motor means, plating weight indicating means being operably connected to said motor means and operable thereby to indicate the amount of plating of said workpiece as a function of weight change thereof, said motor means being actuable by said signal from said signal generating means to actuate said signal control means and cancel said signal so that said motor means is operable for a predetermined interval to indicate the amount of plating of said workpiece responsible for said signal, a timer mechanism, a plating rate indicating device operably connected to said timer mechanism and being operable thereby, an indicating device control actuably connected to said plating weight indicating means and being actuable thereby at a predetermined plating thickness to prevent actuation of said indicating device, and said indicating device being actuable by said timer mechanism after a predetermined interval unless said indicating device control has been previously actuated by said indicating means.

References Cited in the file of this patent
UNITED STATES PATENTS

| | | |
|---|---|---|
| 148,459 | Homan | Mar. 10, 1874 |
| 2,603,595 | Rendel | July 15, 1952 |
| 2,610,052 | Macgeorge | Sept. 9, 1952 |
| 2,657,177 | Rendel | Oct. 27, 1953 |
| 2,681,564 | Jeromson et al. | June 22, 1954 |
| 2,827,725 | Edds | Mar. 25, 1958 |

UNITED STATES PATENT OFFICE
CERTIFICATE OF CORRECTION

Patent No. 3,081,194                          March 12, 1963

John R. Hunsberger et al.

It is hereby certified that error appears in the above numbered patent requiring correction and that the said Letters Patent should read as corrected below.

Column 5, lines 26 and 27, after "minimum" and before the period insert -- plating rate --.

Signed and sealed this 1st day of October 1963.

(SEAL)
Attest:

ERNEST W. SWIDER                              DAVID L. LADD
Attesting Officer                                Commissioner of Patents